Figure 1:
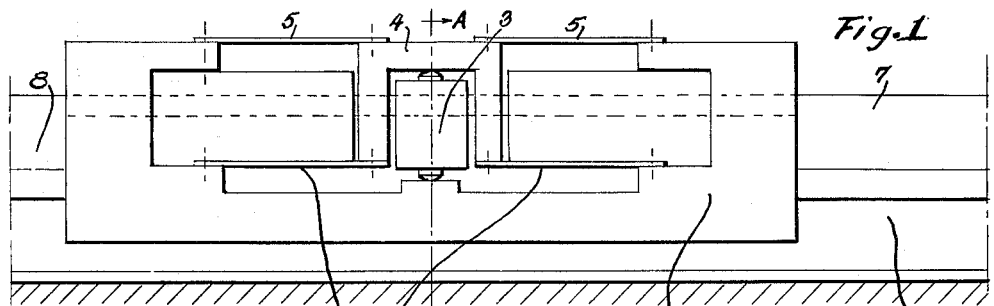

June 4, 1963   A. VON PETERY   3,092,195
WHEEL LOAD SCALE FOR RAIL VEHICLES
Filed July 15, 1960   2 Sheets-Sheet 1

INVENTOR.
Achim V. Petery
BY

June 4, 1963  A. VON PETERY  3,092,195
WHEEL LOAD SCALE FOR RAIL VEHICLES
Filed July 15, 1960  2 Sheets-Sheet 2

INVENTOR.
Anchim V. Petery
BY 3,092,195
WHEEL LOAD SCALE FOR RAIL VEHICLES
Achim von Petery, Darmstadt, Germany, assignor to Carl Schenck Maschinenfabrik G.m.b.H., Darmstadt, Germany, a corporation of Germany
Filed July 15, 1960, Ser. No. 43,014
3 Claims. (Cl. 177—163)

This invention relates to a wheel load scale for rail vehicles comprising weighing devices capable of being adjusted to the various wheel bases either individually or in pairs.

In known scales of this type the various weighing devices are designed to be moved in a scale pit, together with the load receiving elements, in order to be adjusted to the required wheel bases, the load receiving members being arranged laterally from the rails in the zone of the wheel treads. Such scales are very complex, and the fact that they are stationary is often felt to be of disadvantage.

The object of this invention is to provide a scale which does not have these disadvantages. This is possible by constructing the various weighing devices preferably of saddlelike frames positioned across a single rail of the track in which are mounted over the range of the wheel movement vertically movable platform members supported on load sensitive members arranged on both sides of the rail.

An advantageous construction has the load sensitive members attached to the lateral extensions of the frame and uses electrical load cells for load sensitive members.

In order to avoid shock loads on the weighing devices as the moving load approaches, an improvement of the invention is provided between the various weighing devices on the rail intermediate members which are preferably adjustable in length and form with the top of the platform members a level running surface for the wheels of the vehicle.

Extending the construction under reference, mounting parts can be provided ahead of the first weighing device and, if required, also succeeding the last weighing device on each side which run level with the platform top at least the distance of the maximum vehicle length and form, in addition, approaches to the platform level.

To simplify adjustment of the weighing devices to the various wheel bases, it is of particular advantage to rigidly connect to pairs one weighing device arranged at one rail to one of the weighing devices of the other rail.

It is further suitable to provide a common indicating or recording mechanism for several or all of the weighing devices to which they can be connected one at a time.

In an analogous application of the invention it is quite possible to position a section of rail corresponding to the length of the wheel load scale in the shape of a track interruption so much lower that the top level of the platform members is at a level with the running surface of the track. In this manner, approaches are not required.

Figure 2:
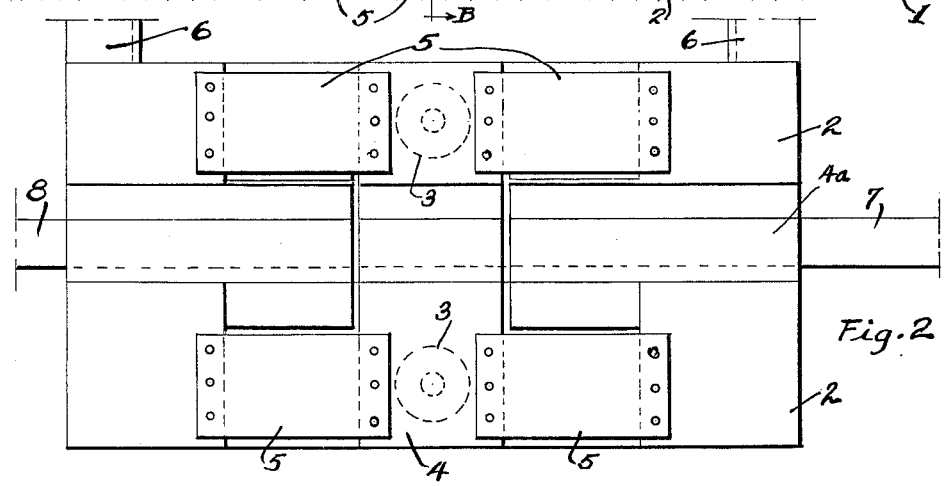
Figure 3:
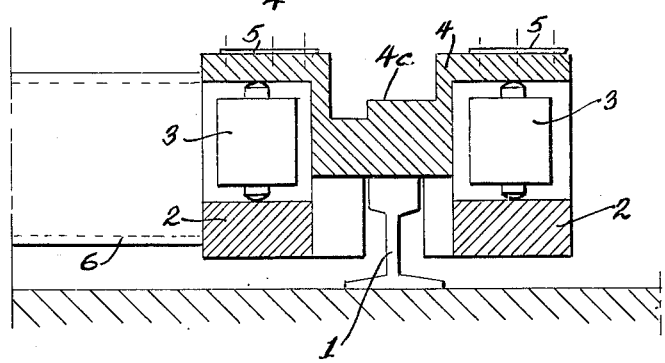
Figure 4:
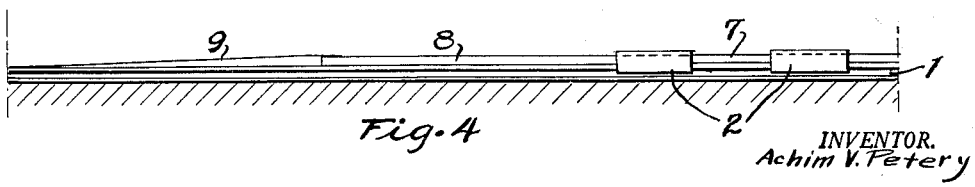
Figure 5:
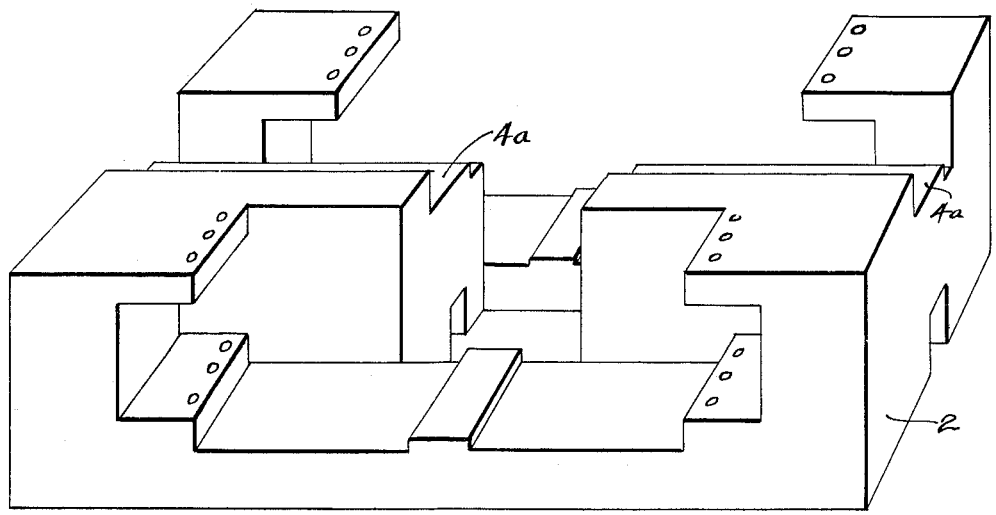
Figure 6:
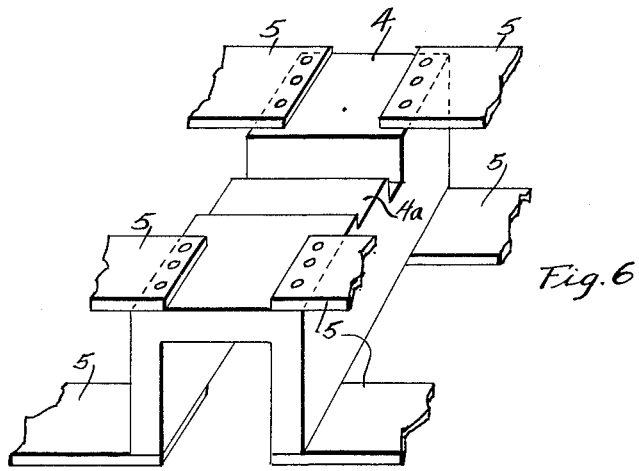

The drawings attached show the invention schematically with the aid of an example of construction:

FIG. 1 shows a weighing device of the wheel load scale of the invention in side view;
FIG. 2 shows the device of FIG. 1 in top view;
FIG. 3 is a section on line A—B of FIG. 1;
FIG. 4 is a side view of the whole wheel load scale for a four-wheeler;
FIG. 5 is a perspective view of the frame of my improved device with the omission of the load cells, and the platform and its guiding flexure plates; and FIGURE 6 is a perspective view of the platform.

Over rail 1 is positioned in the shape of a saddle a frame 2 which in a known but not shown manner is secured in position. On the lateral wings of the frame running parallel to the rail are arranged load cells 3 on which is supported a platform member 4 running across the rail 1. The platform 4 is mounted, by means of leaf-spring parallel guides 5, on the frame 2 so as to be free to move in a vertical direction. The platform member 4 has a running surface 4a which is assimilated to the section of the wheel of the vehicle. By the use of suitable cross ties 6 (FIG. 2) the frame 2 can be connected to the frame of another weighing device on the other rail of the track.

It is suitable to mark on the rail the wheel base of the vehicle to be weighed and then secure the weighing devices singly or in pairs at these points. The empty spaces on the rails between the various weighing devices are filled in by intermediate members 7 which suitably are adjustable for length, so that they can be adapted to the various wheel bases, and which form a level running surface with the running surfaces 4a of the platform members 4. Similar members 8 arranged ahead of the first and, if required, also behind the last weighing device on a rail form a running surface of the same level, where the length of the running surface formed by the members 8 is suitably at least the length of the vehicle to be weighed, in order to keep shocks and vibrations caused by the moving load from the weighing devices. The difference in level between top of rail and running surface is bridged by ramps 9 of suitable inclination.

When the vehicle is positioned on the wheel load scale, each wheel will be stopped on the running surface 4a of a platform member 4. The various wheel loads are determined by load cells which in a known manner are connected to indicating, or recording, mechanism not shown. It is of advantage to provide a common indicating, or recording, mechanism which alternately by means of a changeover device can be connected to any one of the weighing devices.

It will, of course, be understood that various changes in details of construction and arrangement of parts may be made by those skilled in the art without departing from the spirit of the invention as set forth in the appended claims.

I claim:
1. A wheel load scale for rail mounted vehicles comprising a frame in the shape of a saddle for lying transversely over a single rail of a track so as to be supported thereby at spaced points along the rail, said saddle having a recess for receiving the rail and also having wings disposed laterally on each side of the rail and located between said spaced points, load responsive cells supported on said wings, and a vertically movable wheel-supporting platform member overlying the rail in spaced relation thereto and extending laterally over the load cells to be supported thereby.

2. The combination set forth in claim 1 further characterized by the provision of flex plates secured to the frame and to the platform for guiding its movement in a vertical direction.

3. The combination set forth in claim 1 further characterized by the provision of a pair of said wheel scales, one for each of a pair of rails, and means for connecting said scales substantially in transverse alignment with each other.

References Cited in the file of this patent
UNITED STATES PATENTS

| | | |
|---|---|---|
| 2,264,909 | Kelly | Dec. 2, 1941 |
| 2,962,276 | Thurston | Nov. 29, 1960 |

FOREIGN PATENTS

| | | |
|---|---|---|
| 698,338 | Germany | Nov. 7, 1940 |